Sept. 2, 1969   R. G. FERRIS ET AL   3,464,390
PROGRAM CONTROLLED SHUTTLE FEEDER
Filed July 21, 1967   6 Sheets-Sheet 1

Inventors:
Robert G. Ferris
Howard J. Ferris
Allen K. Gillette
By: Hofgren, Wegner, Allen,
Stellman & McCord
Attorneys

United States Patent Office 3,464,390
Patented Sept. 2, 1969

3,464,390
PROGRAM CONTROLLED SHUTTLE FEEDER
Robert G. Ferris, Harvard, and Allen K. Gillette, Belvidere, Ill., and Howard J. Ferris, Gulfport, Fla., assignors to Starline, Inc., a corporation of Delaware
Filed July 21, 1967, Ser. No. 655,223
Int. Cl. A01k 5/02; B65g 47/34
U.S. Cl. 119—56    33 Claims

ABSTRACT OF THE DISCLOSURE

A shuttle type animal feeding apparatus including a trough that receives material thereon at a plurality of material carrying areas from a central supply source, with the trough being reciprocable back and forth over a plurality of animal feeding stations and beneath first and second sets of pivoted sweep members at opposite sides of the supply source which discharge material in the material carrying areas from opposite ends of the trough to the feeding stations. Means is provided for regulating and controlling the amount of material that is deposited in the material carrying areas, so that the amount of feed being discharged from each end of the trough into the animal feeding stations can be varied end controlled.

Cross reference to related application

The present application discloses control means having particular utility with a shuttle type animal feeder, such as that disclosed in Ferris et al. application Ser. No. 592,044, filed Nov. 4, 1966 and assigned to the assignee of the present application, although it will be readily recognized by those skilled in the art that the control means of the present application has general utility in many types of conveying and feeding apparatus dissimilar from that disclosed in the above mentioned Ferris et al. application.

Background of the invention

In the animal feeding art, it has been long recognized that individual animals require different amounts of feed. For example, dairy cows are bred for the most efficient milk production per pound of feed, and challenge feeding is frequently used to match the inherited ability of a particular animal to produce. Additionally, beef animals are also bred so as to maximize the amount of lean meat, and the feed ration for different animals will vary according to their breeding. Heretofore, many widely varying types of schemes have been proposed for feeding relatively large groups of animals, but none of these arrangements has been particularly well suited to the regulation and control of the amount of feed distributed to particular animals.

In the recent past, an improved type of animal feeder has been proposed which comprises a shuttle type of conveyor having a central material supply source with a plurality of pivoted sweeps or baffles at opposite sides of the material supply source in operative association with a movable trough for discharging material from opposite ends of the trough at various animal feeding stations, and such apparatus is typified by that disclosed in the above mentioned Ferris et al. application.

Summary of the invention

The present invention comprises an improvement upon animal feeding apparatus, such as that disclosd in the above mentioned Ferris et al. application, wherein the amount of material that is distributed onto the trough from the central supply source is regulated and varied at different areas of the trough, so that preselected quantities of feed will be dispensed from the trough by the sweep members into the various animal feeding stations. In a preferred embodiment of the invention, the input rate from the supply source is constant, and the trough is stopped beneath the supply source for varying lengths of time for each material carrying area so that different, preselected quantities of feed can be dispensed onto each material carrying area of the trough. In a second preferred embodiment of the invention, the input rate of the supply source is constant, and the speed at which the trough moves by the input source is varied and controlled, so that different quantities of feed will be dispensed onto the various material carrying areas of the trough, depending upon the speed of the trough past the supply source. In a third preferred embodiment of the invention, the discharge from the input source is controlled, and in this embodiment preselected quantities of feed are accumulated at the input source as the different material carrying areas of the trough move therebeneath, and the accumulated quantities are distributed onto the various material carrying areas of the trough.

In an exemplary arrangement, the trough reciprocates between two spaced longitudinally extending rows of animal feeding stations, with the trough first dispensing preselected quantities of feed into each of the animal feeding stations of the first row, and then dispensing preselected quantities of feed into the animal feeding stations of the second row. The preferred arrangement desirably includes means for automatically shifting feed diverters at opposite ends of the trough from a first position to dispense feed into the animal feeding stations of the first row to a second position to dispense feed into the animal feeding stations of the second row, when the desired preselected amount of feed has been discharged to each of the animal feeding stations of the first row.

The principal object of the present invention is to not only provide a feeding and conveying apparatus wherein different preselected quantities of feed can be distributed into a plurality of animal feeding stations, but also to provide novel control systems for the conveying and feeding apparatus which substantially automates the same. Another object of the invention is to provide simplified control systems for an animal feeder of the type described above, wherein a minimum number of components are used, and wherein several of the components may be used to regulate and control the amount of feed that is distributed to more than one animal feeding station. A further object of the invention is to provide feed regulating means for a conveyor of the type described above wherein information regarding the amount of feed to be dispensed in each animal feeding station is carried by the trough of the conveyor.

Description of the preferred embodiments

While this invention is susceptible of embodiment in many different forms, there is shown in the drawings and will herein be described in detail several embodiments of the invention with the understanding that the present disclosure is to be considered as an exemplification of the principles of the invention and is not intended to limit the invention to the embodiments illustrated. The scope of the invention will be pointed out in the appended claims.

Figure 1:
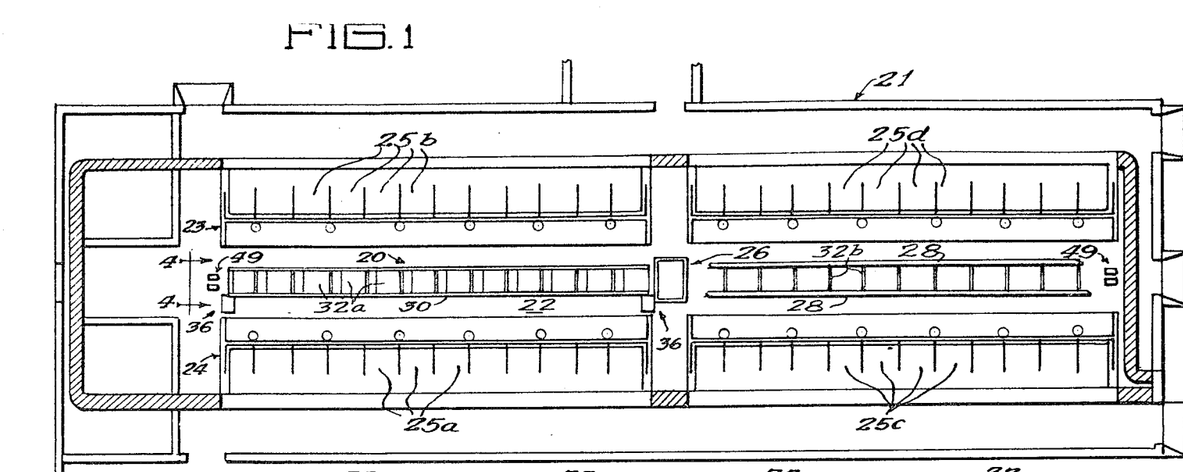
FIG. 1 is a fragmentary plan view of a typical barn arrangement wherein the conveying and feeding apparatus of the present invention is longitudinally reciprocable between two spaced, longitudinally extending rows of animal feeding stations.

Referring now in detail to the drawings, a preferred embodiment of the conveying and feeding apparatus of the present invention is indicated in its entirety in FIG. 1 by reference numeral 20, and for purposes of example the apparatus is illustrated in use with a stanchion type cow barn 21, although it will be appreciated that the apparatus may also be used outdoors to distribute feed into a feed bunk. The conveying and feeding device 20 is positioned above the floor 22 of barn 21 substantially on the longitudinal median plane between spaced longitudinally extending rows 23 and 24 of animal feeding stations 25. A supply source 26 is provided centrally above the conveying and feeding apparatus 20, and is adapted to discharge material onto the conveyor as it reciprocates therebeneath, and as is explained in detail in the above mentioned Ferris et al. application. As is shown in FIG. 1, the animal feeding stations to the left of supply source 26 and on opposite sides of the conveyor 20 are referred to with the subscripts $a$ and $b$ respectively, while the animal feeding stations to the right of supply source 26 and on opposite sides of the conveyor 20 are referred to with the subscripts $c$ and $d$ respectively.

Figure 2:
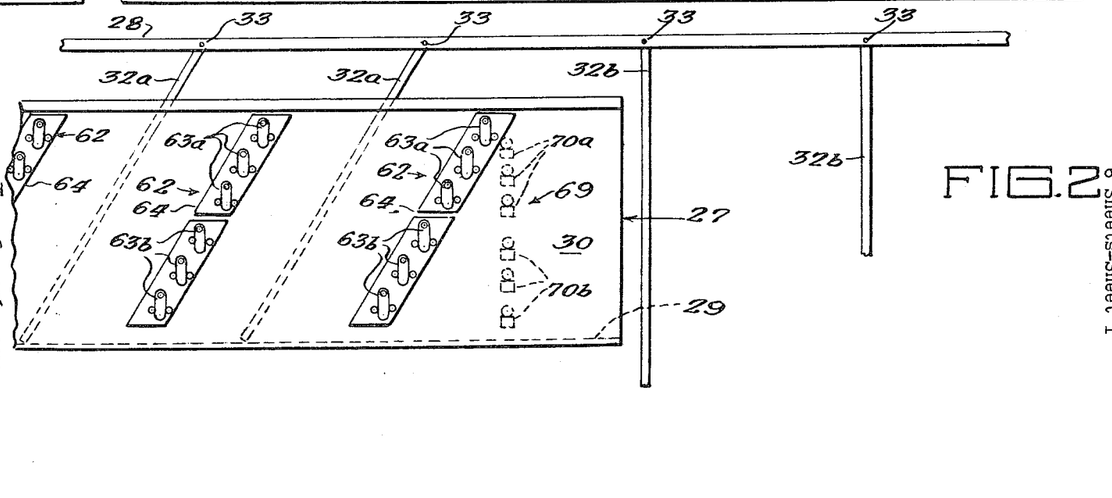
FIG. 2 is an enlarged fragmentary side elevational view illustrating principally the sweeps for discharging material from the trough, the selectively programmable information storing means on the trough, and the means for reading the information stored on the trough.

Apparatus 20 includes a trough member 27 that is mounted for longitudinal reciprocating movement beneath supply source 26 by suitable support means 28. Trough 27 is U-shaped in end view, and includes a base 29, and upstanding side walls 30. A plurality of generally rectangularly shaped sweep members 32 (the set of sweep members to the left of supply source 26 are referred to with subscript $a$ and the set of sweep members to the right of supply source 26 are referred to with subscript $b$) are pivotally connected to support structure 28 at 33, and as best seen in FIG. 2, the distance between pivots 33 and the end of the sweep members is greater than the distance between pivot 33 and the bottom wall 29 of the trough 27, so that the sweep members 32 will either contact the material on the trough 27, or the bottom wall 29 of the trough. Sweep members 32$b$ ride over the material that is deposited upon the trough 30, as the trough moves from left to right as viewed in FIG. 1 and when the trough member 30 is reversed at the end of its stroke, the sweep members 32$b$ are inclined to scrape the material off of the right-hand end of the trough as the trough reciprocates from right to left therepast. When the trough 30 is moving from right to left, material is being deposited upon the trough, and the sweep members 32$a$ ride over the material. When the direction of movement of trough 30 is reversed at the end of its stroke, the sweep members 32$a$ are inclined to sweep the material on the trough 30 off of the left-hand end thereof. Any suitable drive means 34 may be provided for reciprocating the trough 30, and the means disclosed in the above mentioned Ferris et al. application are suitable for purposes of the present invention. As is evident from the above description, one sweep member is provided for each animal feeding stations 25$a$ and 25$b$, and one sweep member is provided for each animal feeding stations 25$c$ and 25$d$. Likewise, the trough 30 may be considered as having a plurality of material carrying areas equal to one-half the number of animal feeding stations in rows 23 or 24.

Assuming that the conveying and feeding apparatus 20 is first operated to dispense material into the animal feeding stations 25$b$ and 25$d$ of row 23, when the appropriate preselected quantities have been dispensed, means is provided for automatically shifting feed diverters 36 at opposite ends of the trough 30 so that discharge can take place into animal feeding stations 25$a$ and 25$c$ in row 24.

Figures 3, 4, 5, 6:
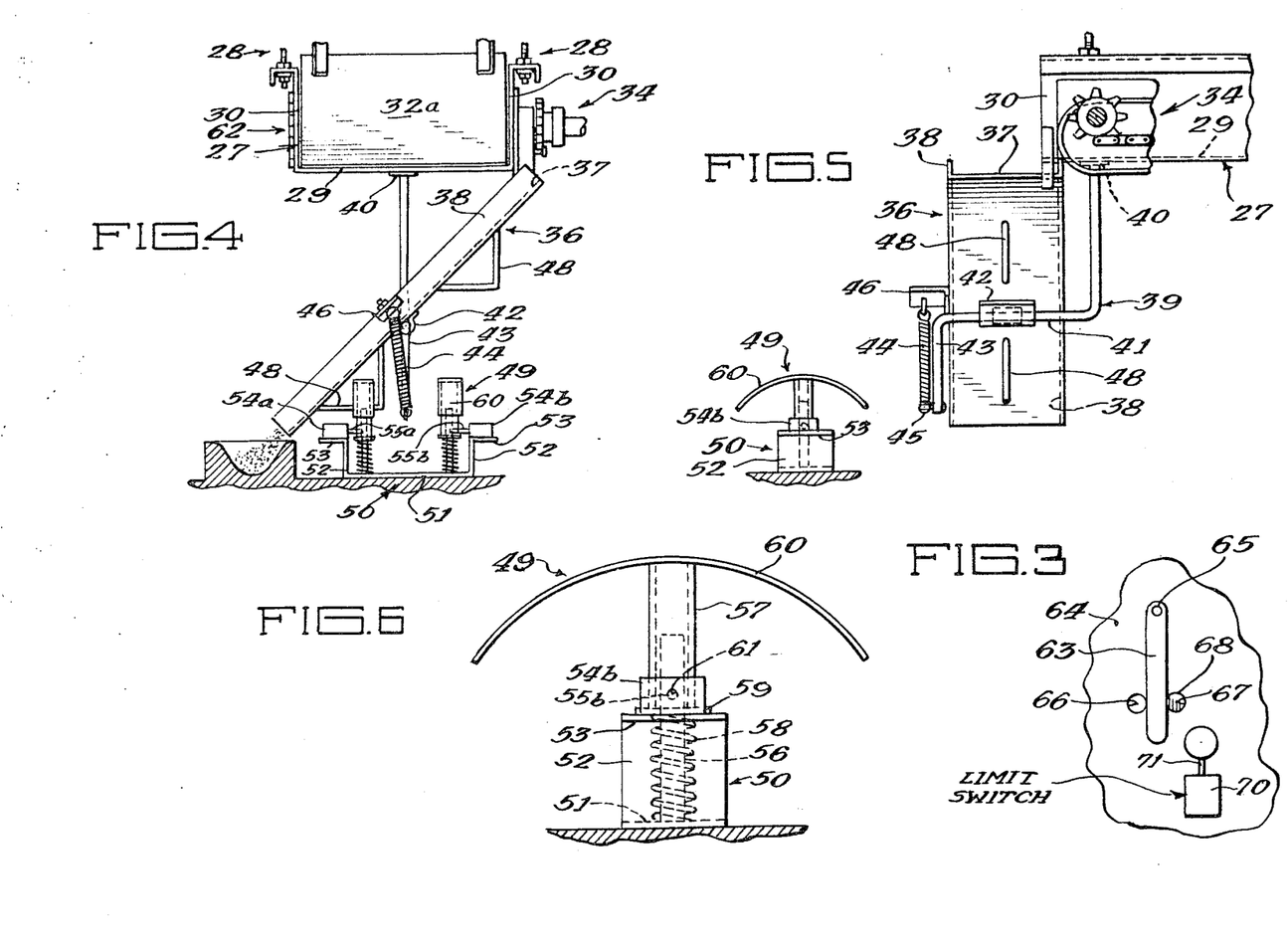
FIG. 3 is an enlarged fragmentary side elevational view showing one of the trigger members of the information storing means on the trough, and also illustrating diagrammatically a portion of the read-out means associated with the selectively programmable trigger.
FIG. 4 is an enlarged end view of the conveying and feeding apparatus of the present invention, and taken generally along line 4—4 of FIG. 1.
FIG. 5 is a fragmentary side elevational view of the structure shown in FIG. 4, and illustrates principally the trough and diverter control therefor.
FIG. 6 is an enlarged side elevational view of a control means for automatically shifting the feed diverter.

The diverters 36 at opposite ends of the trough 27 are generally identical, and the construction thereof will be best understood from FIGS. 4 and 5, wherein the diverters 36 are shown to be generally U-shaped in cross section, with a transverse bottom wall 37 having upstanding side walls 38 at opposite edges thereof. Diverters 36 are each positioned under an end of trough 27 to receive material therefrom and the diverters are each carried by a bracket 39, the upper ends 40 of which are secured to the transversely extending portion 29 of trough 27 adjacent opposite ends thereof. Brackets 39 include a horizontally disposed central portion 41 extending in the direction of trough movement, and which impales a bracket 42 fixed to the lower central portion of diverter bottom wall 37 to mount the diverters for pivotal movement perpendicularly to the direction of movement of trough 27. Brackets 39 further include a vertically downwardly extending portion 43 at the outer end of central portion 41, and the lower end of a helical spring 44 is connected to the lower end of bracket portion 43 by a suitable fastener, such as eye bolt 45. The upper end of spring 44 is connected to a suitable fastener on a bracket 46 that extends laterally outwardly from the central portion of the outer wall 38 of diverter 36. Since the upper spring mount 46 is positioned above the pivot axis defined by bracket portion 41, spring 44 functions in an over-center manner to urge the diverter 36 to an inclined position, such as that shown in FIG. 4 wherein the diverter receives material from the end of the trough 27 and directs the same into one of the animal feeding stations. A pair of L-shaped abutments 48 are secured to the undersurface of diverter bottom wall 37 at positions spaced an equal amount on opposite sides of bracket 42, and abutments 48 are positionable to engage cam means 49, to be hereafter described in detail, for automatically shifting the diverter from one row of animal feeding stations to the other row of animal feeding stations.

One cam means 49 is provided for each abutment 48, and thus a pair of cam means is provided at each end of the rows of feeding stations. Each pair of cam means 49 is carried by a suitable support bracket 50 that is positioned centrally beneath trough 27 slightly beyond the end of the stroke of movement of the trough. Brackets 50 include a bottom wall 51, that may be secured to the floor 22 of barn 21, and vertical side walls 52 extend upwardly at opposite edges of bottom wall 51, with horizontally disposed flanges 53 extending outwardly from the upper ends of side walls 52. Solenoids 54a and 54b are each mounted on the upper surface of one of flanges 53, with the solenoid plungers 55a and 55b facing one another and being retracted when their respective solenoid is energized. A square post 56 is secured to the base 51 of support 50 immediately inwardly of each support side wall 53, and a square tube 57 is telescopically mounted on each post 56. A coil spring 58 is received over each post 56, with the lower end of each spring bearing against base 51, and the upper end of each spring bearing against a washer 59 that supports the lower end of tube 57. A curved cam plate 60 is fixed to the upper end of each tube 57, and is positioned to be engaged by one of the abutments 48 on a feed diverter 38. Tubes 57 include a hole 61 that is positioned in alignment with the associated solenoid plunger by springs 58, so that when the respective solenoid is deenergized, the plunger is received within hole 61 to prevent the cam plate 60 from moving downwardly. Thus, when the solenoids for the row of animal feeding stations that are receiving feed are deenergized, one abutment 48 on each diverter 36 will ride up on its associated curved cam plate 60 to pivot the diverters past a horizontal position whereupon springs 44 will move the diverter to an oppositely inclined position. When the solenoids are energized and the plungers retracted, the abutments 48 will engage cam plates 60 and move the tubes 57 downwardly against the bias of springs 58, it being understood that the weight of the diverter and the strength of the spring 44, in relation to the strength of spring 58, is such that the diverters will not reverse.

Trough 27 is selectively programmable with information regarding the amount of feed to be distributed into each of the animal feeding stations, and the selectively programmable means will be best understood from FIGS. 2 and 3 to include a plurality of trigger sets 62, one set for each material carrying area of the trough 27, and each set 62 including a plurality of individually selectively programmable triggers 63. In the illustrated embodiment, each set 62 is shown as including six triggers 63, with the upper three triggers being given the subscript a and the lower three triggers being given the subscript b for a purpose which will hereafter appear. Triggers 63 are each carried by inclined support plates 64, and each trigger 63 is pivotally secured at its upper end by a pivot pin 65 to a support plate 64. As is evident from FIG. 2, because of the inclination of support plates 64, each of the triggers 63 is horizontally offset from one another, and the significance of this horizontal spacing will become more apparent as the description of the control means proceeds. Each trigger 63 is selectively programmable by means of a pair of openings 66 and 67 (FIG. 3) provided in support plate 64 at opposite sides of each of the triggers, with pins 68 being insertable within openings 66 and/or 67 to prevent or allow pivoting of the triggers in either direction, as desired.

Figure 7:
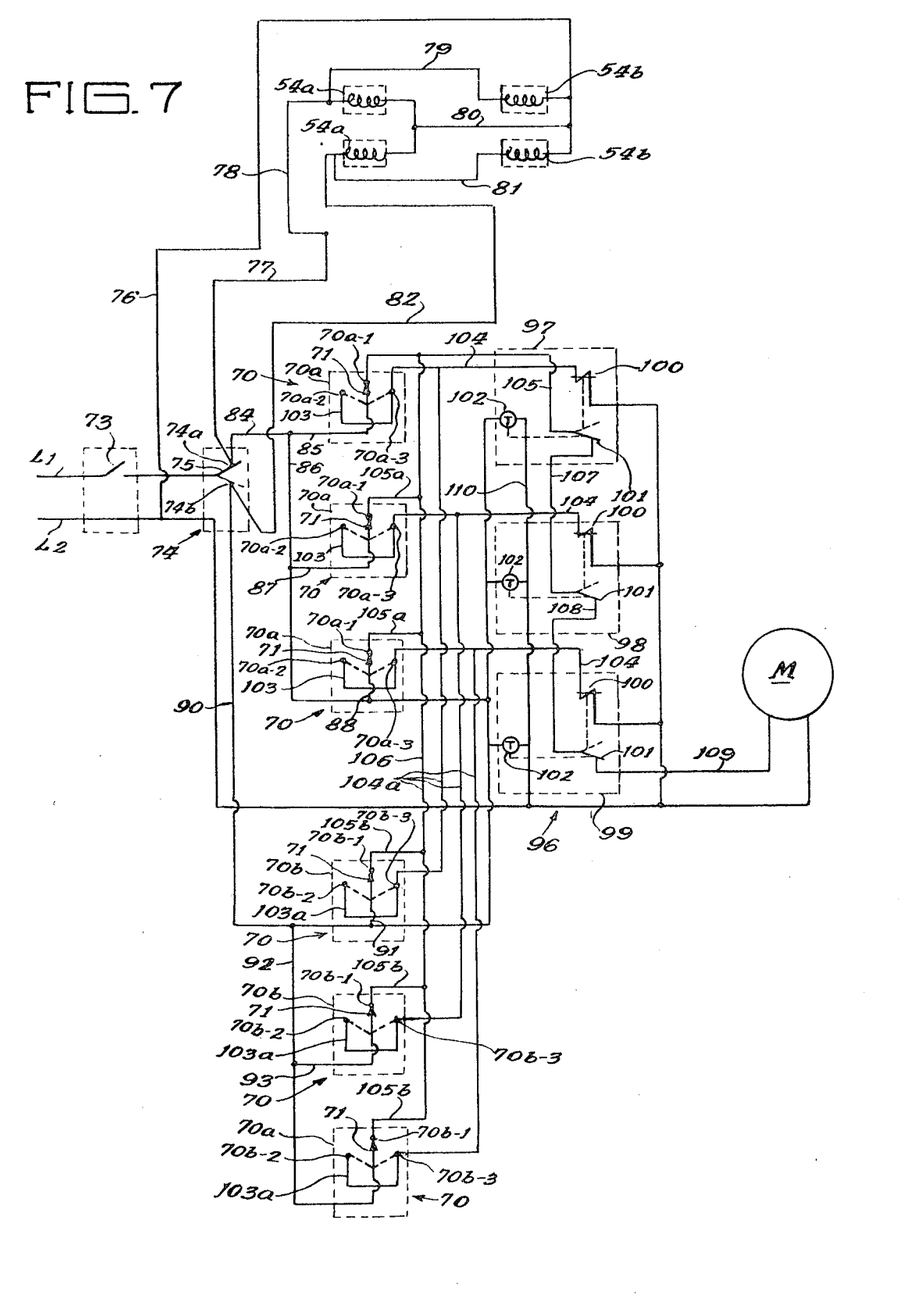
FIG. 7 is an electrical schematic view of a first embodiment of a control means for varying and regulating the amount of feed that is distributed into each of the animal feeding stations.

Means is provided for reading the information that is programmed on trough 27 by selective placement of pins 68, and in the embodiment of FIGS. 1–7, the read-out means comprises a set 69 of individual limit switches 70, one limit switch being provided for each trigger 63. As is evident from FIG. 2, the six limit switches 70 are vertically aligned, and switches 70 are preferably mounted upon suitable fixed support structure (not shown) immediately adjacent the path of movement of trough 27. For purposes to hereafter appear, subscript a is added to the upper three limit switches, while subscript b is added to the lower three limit switches. As seen in FIG. 7, limit switches 70 are of a conventional commercially available type wherein pivotally mounted actuator 71 (FIG. 3) is movable between a central first contact (70a–1 and 70b–1) a second contact (70a–2 and 70b–2) spaced in a counterclockwise direction from the first contact, and a third contact (70a–3 and 70b–3) spaced in a clockwise direction from the first contact. As is well known, spring means is provided internally of each switch 70 to bias the actuator 71 thereof into engagement with the first switch contact, and the internal switch spring means is sufficiently strong that the triggers 63 will normally pivot and ride over the switch actuators, unless pivotal movement of a trigger is blocked by a pin 68.

Referring now to the circuit diagram of FIG. 7, leads L–1 and L–2 are connected to a suitable source of electrical energy, and a main switch 73 is connected in line L–1 to energize and deenergize the circuit. Reversing means 74 is provided for selectively energizing either the solenoids 54a and 55b for row 23, or the solenoids 54a and 55b for row 24, thereby providing control means for reversing the feed diverters 36. In a semiautomatic form of the invention, the reversing means 74 may take the form of a single pole double throw switch, while in a fully automated version of the invention, an adjustable cam timer may be provided for actuating the reversing means 74 after a preselected time period has elapsed. For purposes of illustration, the reversing means 74 is illustrated as including a switch arm 75 movable between a pair of spaced contacts 74a and 74b, with a circuit being completed to the upper set of solenoids 54a and 54b through lines 76, 77, 78 and 79 when switch arm 75 is in engagement with contact 74a and a circuit being completed to the lower pair of solenoids 54a and 54b through lines 76, 80, 81 and 82 when the switch arm 75 is in the broken line position in engagement with contact 74b. Thus, it will be appreciated that when the switch arm 75 is in the full line position in engagement with contact 74a the upper pair of solenoids 54a and 54b will be energized while the lower pair of solenoids 54a and 54b are deenergized, and in a like manner, when the switch arm 75 is in the broken line position in engagement with 74b the upper pair of solenoids 54a and 54b are deenergized while the lower pair of solenoids 54a and 54b are energized. Reversing means 74 is actuated in a manner such that the solenoids 54a and 54b for the row of animal feeding stations into which feed is being distributed will remain energized until the preselected quantity of feed has been distributed into each of the stations, at which time reversing means 74 is actuated, either manually or automatically, to deenergize the solenoids 54a and 54b for the row and thus lock cam plates 60 aaginst downward movement so that the diverters 36 will be reversed at the ends of the stroke of trough 27 by engagement of the abutments 48 on the diverters with the cam plates 60.

Only a single set of read-out switches 70 is required to control energization of the drive motor M and the reciprocation of the trough 27. The upper group of switches 70a of set 69 are connected in circuit with the motor M, when the switch arm 75 of reversing means 74 is in engagement with contact 74a, through lines 84, 85, 86, 87 and 88; and the lower group of switches 70b of the set 69 are connected in circuit with the motor M when the switch arm 75 of the reversing means 74 is in engagement with contact 74b through lines 90, 91, 92 and 93. It will be appreciated that when the switch arm 75 of the reversing means is in the full line position in egagement with contact 74a, the circuit to the lower group of switches 70b is open, while when the switch arm 75 is the broken line position in engagement with contact 74b, the circuit to the upper group of switches 70a is open. Thus, the upper triggers 63a in each set are programmable with information regarding the amount of material to be distributed ino one row of animal feeding stations, while the lower triggers 63b in each set are programmable with information regarding the amount of material to be distributed in the other row of animal feeding stations.

The pins 68 and holes 67 to one side of the triggers 63 of each group of triggers 63a provides means for selectively programming the amount of material that is to be distributed into a first animal feeding station that is serviced by a particular material carrying area on the trough 27, while a second group of pins 68 and openings 66 on the opposite side of a group of triggers 63a provides means for selectively programming the amount of material that is to be distributed to a second animal feeding station in the same row as the first station, but on an opposite side of the central supply source 26. In a like manner, the pins 68 and holes 67 on one side of the group of triggers 63b provides a selectively programmable means for determining the amount of material that is distributed into an animal feeding station in an opposite row of stations on one side of supply source 26, while the holes 66 and pins 68 provide a still further selectively programmable means for determining the amount of feed that is distributed into a still further animal feeding station in the same row as the last mentioned station, but on an opposite side of central supply source 26. As is evident from the above description, each material carrying area on trough 27 services four animal feeding stations, one in each set of stations 25a–25d. Thus, each set 62 of triggers 63 provides means for selectively programming four different quantities of material for each of the material carrying areas of the trough 27.

The control circuit illustrated in FIG. 7 includes means 96, responsive to the reading of information by read-out switches 70, for interrupting the circuit to the trough drive motor M to stop the trough for varying lengths of time under the supply source 26. In the control embodiment of FIG. 7, the feed input rate from supply source 26 is constant, so that by positioning each material carrying area of trough 27 under the supply source for a preselected period of time, the quantity of material that is discharged onto the trough 27 (and thus discharged into each of the animal feeding stations) will be proportionate to the dwell period of the trough under the supply source, so that the quantity to be discharged can be varied and controlled by varying and controlling the trough dwell period. Means 96 includes a plurality of trough dwell controlling units 97, 98 and 99, which in the present embodiment of the invention may take the form of conventional commercially available interval timers, and each of the interval timers 97–99 includes a solenoid 100 which opens a switch 101 from the full line closed position to the broken line open position when the solenoid is energized. Timers 97–99 further include an adjustable motor driven timer clock 102 for retaining its associated switch 101 in the open broken line position for preselected periods of time, which may be adjusted as desired.

Contacts 70a–2 and 70a–3 of the upermost read-out switch 70a are connected in circuit with the solenoid 100 of interval timer 97 by lines 103 and 104, and contact 70a–1 of the uppermost read-out switch is connected in circuit with switch 101 of timer 97 through line 105. In a like manner, the contacts 70a–2 and 70a–3 of the lower two read-out switches 70a are connected in circuit with the solenoids 100 of respective interval timers 97 and 98, respectively, by lines 103 and 104, while contacts 70a–1 are connected in circuit with the respective timer switches 101 through lines 105a, 106, 105, 107 and 108. Switch 101 of timer 99 is connected to motor M through line 109, and from the above, it will be apparent that the switches 101 in the timers 97–99 are each connected in series with the motor M.

The lower group of read-out switches 70b of the set illustrated in FIG. 7 is connected in circuit with the same interval timers 97–99 as the upper group of read-out switches, so as to minimize the number of components required for the system to reduce the cost thereof. For this purpose, contacts 70b–2 and 70b–3 of each of the lower read-out switches are connected to solenoids 100 through lines 103a, 104a and 104; while contacts 70b–1 are connected in series with switches 101 through lines 105b, 106, 105, 107, 108 and 109. In this manner, one group of three timers 97–99 may be utilized in combination with each set of six triggers 63 and read-out switches 70. As has been mentioned above, timer clocks 102 are adjustable devices, and for purposes of example, the timer clock 102 of timer 97 may be set to keep its switch 101 open for two seconds, while the timer clock 102 of timer 98 may be set to keep its switch 101 open for five seconds and the timer clock 102 of timer 99 set to keep its switch 101 open for ten seconds.

In operation, assuming that the trough 27 is at the extreme left-hand end of its stroke with the diverter 36 being positioned to dispense feed into the animal feeding stations in row 24, and assuming further that the animal in the extreme right-hand animal feeding station of group 25c is a heavy eater, the group of triggers 63a for the first material carrying area at the right-hand end of trough 27 will have been selectively programmed by placing a pin 68 in each of the openings 66 adjacent the first group of triggers 63a. Thus, as the trough 27 begins to move to the right to place the endmost material carrying area of the trough under the supply source 26, the uppermost trigger 63a will be held against pivotal movement by its associated pin 68, and the uppermost read-out switch 70a will be actuated by having the trigger 63a move the switch actuator 71 from contact 70a–1 to contact 70a–3. This will energize the solenoid 100 of timer 97 to open the associated switch 101 and interrupt the circuit to motor M. The inertia of the trough 27 is sufficient to move the trigger 63a past the switch actuator 71, but adjacent triggers 63a are spaced horizontally from one another a distance, sufficient due to their inclination, that the inertia of the trough 27 will not move the trough sufficiently far to have the second trgger actuate its associated read-out switch. Thus, the uppermost switch actuator 71 is only momentarily closed to contact 70a–3, and will return to contact 70a–1 as soon as the trigger 63a moves out of engagement with the switch actuator 71. However, clock 102 of timer 97 is energized simultaneously with the energization of solenoid 100 through line 110, and the clock 102 retains the switch 101 of timer 97 open for the preset period, two seconds in the present example.

When the time period for which the clock 102 of timer 97 has been set elapses, switch 101 closes to again complete a circuit to the motor M until the second trigger 63a actuates its read-out switch 70a, which opens the circuit to the motor M for the period at which the clock 102 of timer 98 is set, five seconds in the present example. When the switch 101 of timer 98 closes, the circuit will again be completed to the motor M and the trough will resume movement until the third trigger 63a actuates its associated read-out switch 70a to stop the trough 27 for the length of time that has been selected for clock 102 of timer 99, ten seconds in the present example. Since the first group of triggers 63a are each provided on the trough side wall 30 in an area corresponding to the material carrying area associated with the farmost animal feeding station in row 24, the first material carrying area of the trough 27 will be positioned under supply source 26 for an aggregate time of seventeen seconds, and this will result in a maximum amount of feed being discharged into the first material carrying area of the trough, which in turn will be dispensed into the farmost right-hand animal feeding station of row 24 by the endmost sweep 32b when the trough begins to move from right to left as viewed in FIG. 1. From the foregoing, it will be appreciated that each material carrying area of trough 27 can be positioned under the material supply source 26 for any one of six periods of time, depending upon the number of pins 68 that are placed in openings 66 or 67. With the timers 102 set for the periods mentioned above, the material carrying areas of the trough can be positioned under supply source 26 to periods of 2, 5, 7, 12, 15 and 17 seconds, so that widely varying amounts of material can be deposited on the trough at the various material carrying areas to closely match the inherited feed eating ability of the animal occupying the feeding station associated with each of the trough material carrying areas. In the embodiment of FIG. 7, a further different amount can be programmed by the complete absence of pins, in which case a slight amount of material will dribble onto the conveyor as the associated area moves under the supply source. It will be understood that the input rate from supply source 26 is intended to be constant and continuous, and that the trough 27 is reciprocated back and forth a plurality of times beneath the supply source to average out any slight variations that may occur in the feed rate from the supply source.

When the programmed amount of material has been dispensed into each of the animal feeding stations in row 24, reversing means 74 is actuated, either manually or automatically, to energize a set of solenoids 54a and 54b to reverse the feed diverters 36. Triggers 63b and their associated read-out switches 70b will then function in the manner described above in connection with triggers 63a and read-out switches 70a to deliver the programmed amount of animal feed to each of the animal feeding stations in row 23.

Figure 8:
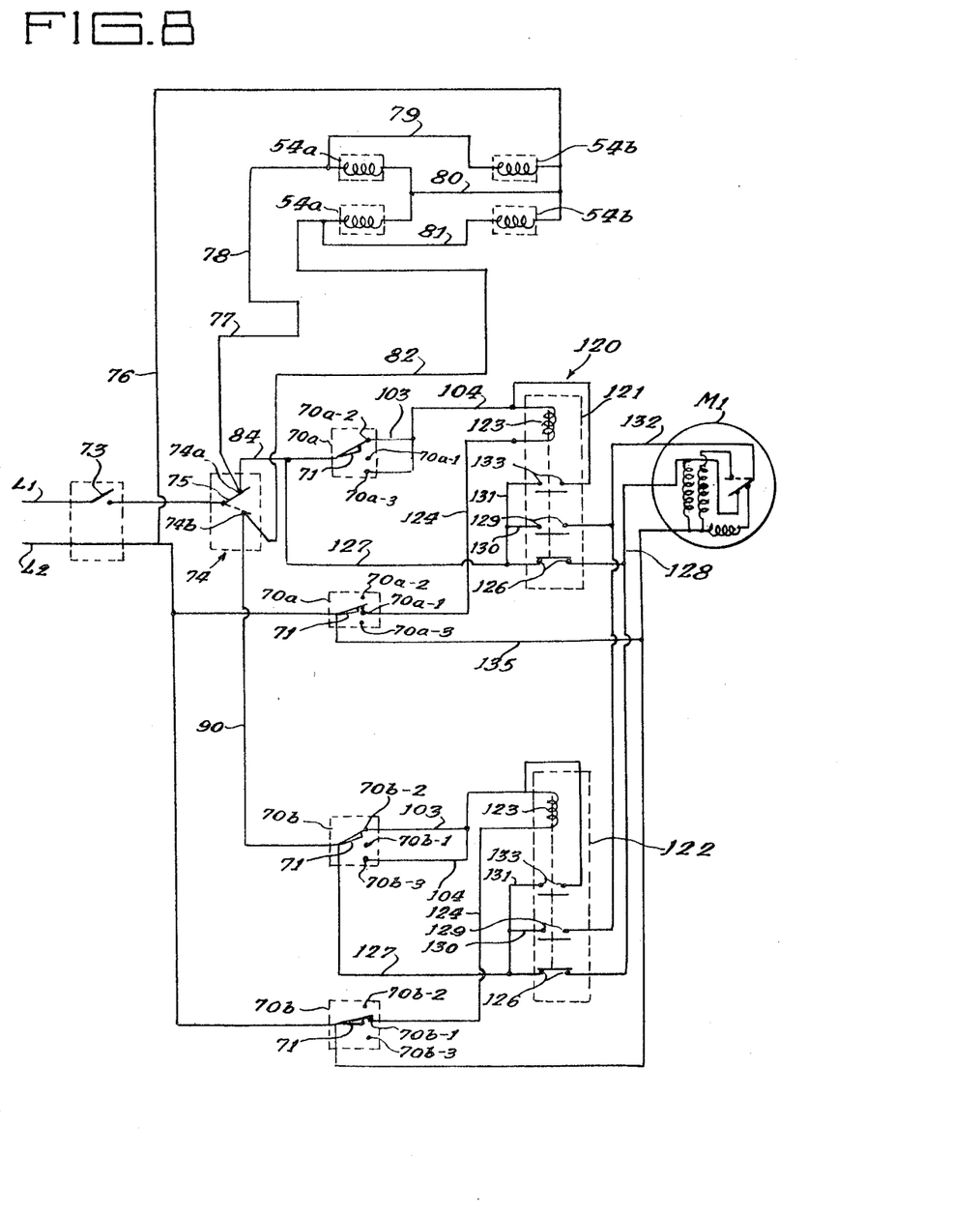
FIG. 8 is an electrical schematic diagram of a second control means for varying and regulating the amount of feed that is distributed into each of the animal feeding stations.

Referring now to FIG. 8, a second embodiment of the control means of the present invention is illustrated, and in this embodiment, the feed rate from the supply source 26 is constant, while the trough 27 is moved beneath the supply source at preselected variable speeds (without stopping) to thereby vary and control the amount of material that is discharged onto each of the material carrying areas of the trough from the supply source, whereby the amount of material that is dispensed into each of the animal feeding stations can be varied and controlled. Certain elements of the control means of FIG. 8, such as the diverter reversing means 74 and associated circuitry, is identical with that described above in connection with the embodiment of FIG. 7, and the same reference numerals have been used to designate common elements of the two embodiments. For purposes of simplification, the trough drive motor M1 is illustrated as a two-speed split-phase motor, and only two read-out switches 70a and two read-out switches 70b are provided; although it will be appreciated that motor M1 could have additional windings for different speeds, and further read-out means would be provided for these speeds. With the embodiment of FIG. 8, two triggers 63a and two triggers 63b are preferably provided for each material carrying area on the trough 27 and the triggers may be vertically arranged on the trough. The triggers are selectively programmed with information regarding the amount of feed to be distributed into two animal feeding stations in each row, one station on each side of the supply source, in the same manner as with the control system of FIG. 7; that is, by selective placement of pins 68 in openings 66 and 67 to prevent or allow the triggers 63 to pivot. In the embodiment of FIG. 8, the means 120 responsive to the reading of information by switches 70 for controlling motor M1 includes a first three-pole, single throw magnetic relay 121 associated with a first row of animal feeding stations, and a second three-pole, single throw magnetic relay 122 associated with the other row of animal feeding stations. One side of the coil 123 of relay 121 is connected to the contacts 70a–2 and 70a–3 of a first read-out switch 70a through lines 103 and 104, and the other side of coil 123 of relay 121 is connected to the power source through line 124 and a second read-out switch 70a. Relay 121 includes a first pair of normally closed contacts 126 in a line 127 that extends between line 84 and a further line 128 that is connected to the high speed winding of motor M1. Relay 121 includes a first pair of normally open contacts 129 in a line 130 that is connected between a line 131 and a further line 132 that is connected to the low speed winding of motor M1, and relay 121 includes a second pair of normally open contacts 133 in line 131.

Assuming that it is desired to deposit the minimum amount of feed in a particular animal feeding station, and that the trough is moving at high speed when the corresponding material carrying area on the trough begins to move under the input source, the upper trigger 63a associated with the particular trough material carrying area is selectively programmed by the absence of a pin 68 so that the trigger 63a will pivot freely and not move the switch actuator 71 of upper switch 70a. With the switch actuator 71 in engagement with contact 70a–1, the coil 123 of relay 121 is deenergized, and a circuit is completed to the high speed winding of motor M1 through line 127, contacts 126, line 128, and line 135.

If it is desired to deposit a maximum amount of feed in the animal feeding station associated with the next adjacent material carrying area of the trough, its associated upper trigger 63a is selectively programmed by placement of a pin 68 to prevent the trigger 63a from pivoting, and thus the switch actuator 71 of the upper limit switch 70a is moved to the full line position illustrated in FIG. 8 in engagement with contact 70a–2. The coil 123 of relay 121 is energized through a circuit including lines 103, 104, 124 and lower switch 70a, thus closing contacts 129 and 133, and opening contacts 126. The closing of contacts 129 completes a circuit to the low speed winding of motor M1 through lines 127, 130, 131, 132 and 135. The closing of contacts 133 completes a holding circuit for relay coil 123 through lines 127, 131 and 124 and retains the motor M1 on low speed even though the upper switch 70a is only momentarily actuated by its associated trigger 63a. If the next animal feeding station is also to receive a maximum amount of feed, the corresponding lower trigger 63a on the trough is selectively programmed to pivot freely with respect to the actuator 71 of the lower switch 70a so that the holding circuit for relay coil 123 will not be opened.

If it is desired to deposit a minimum amount of feed in the next adjacent animal feeding station, the lower trigger 63a associated with the next trough material carrying area is selectively programmed to pivot the actuator 71 of the lower switch 70a to contact 70a–1 to interrupt the holding circuit to coil 123 and allow contacts 129 and 133 to open and contacts 126 to close and complete a circuit to the high speed winding of motor M1.

When the trough is moving in a direction opposite to that described in the two preceding paragraphs to dispense feed into the animal feeding stations on an opposite side of the supply source, the lower switch 70a will function in the manner described above to retain the motor on low speed except when a trigger is programmed to move the actuator 71 to contact 70a–3. In a like manner, the motor M1 will run at high speed until the switch actuator 71 of the upper switch is engaged by a trigger that is programmed to pivot actuator 71 into engagement with contact 70a–3 to energize coil 123 and complete a circuit to the low speed winding of the motor.

After the dispensing of feed into the animal feeding stations of one row is completed, reversing means 74 is actuated to move switch arm 75 into engagement with contact 74b thereby bringing motor M1 under the control of the portion of the circuit including read-out switches 70b associated with the other row of animal feeding stations. The circuit for the latter row of animal feeding stations functions identically with the circuit for the first mentioned row of animal feeding stations, and thus will not be described in detail.

For purposes of example, the motor M1 illustrated in FIG. 8 may have speeds of 1725 and 860 r.p.m., but other speeds are commercially available. In a preferred arrangement, the motor speed is stepped down by a ratio of approximately 15 to 1 by gear reducer means or other suitable structure associated with the motor output shaft.

Figure 9:
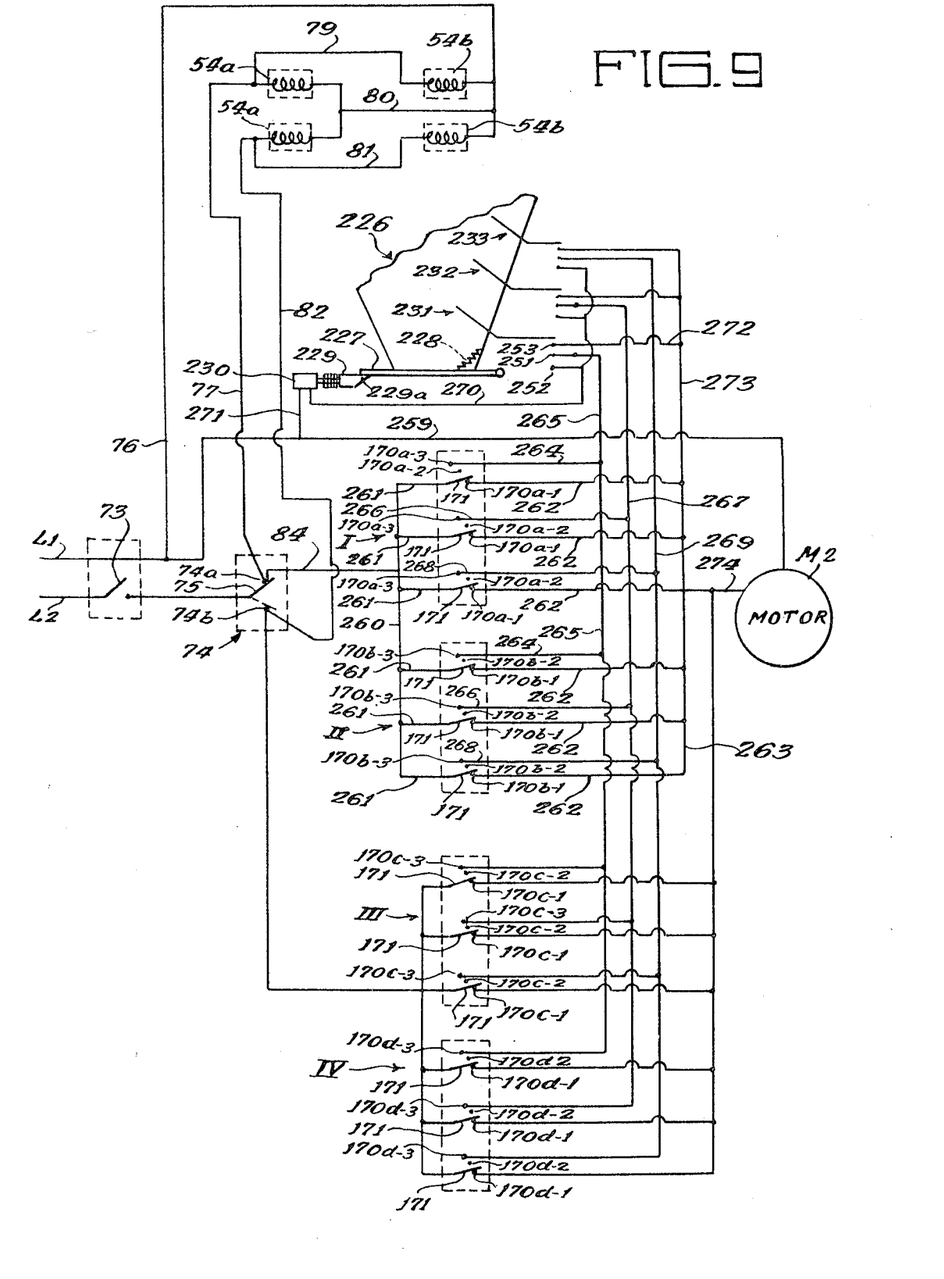
FIG. 9 is an electrical schematic diagram of a third control means for varying and regulating the amount of feed that is distributed into each of the animal feeding stations.

Referring now to the embodiment of FIGS. 9–12, the input hopper 226 of the central supply source is illustrated in FIG. 9 as including a pivotally mounted bottom plate 227 that is urged by a spring 228 to a hopper closing position. A latch 229 normally retains the bottom plate 227 in a hopper closing position, and latch 229 is carried upon the plunger of a solenoid 230, so that when the solenoid is energized, the latch member 229 is withdrawn to a clearance position and the bottom plate 227 is pivoted by the weight of material that has accumulated in the hopper to enable the material within the hopper to drop onto the trough positioned thereunder. Spring 228 is sufficiently weak that relatively small quantities of feed, such as ten pounds, may easily pivot the bottom plate 227, but spring 228 is sufficiently strong to rapidly close the plate 227 after the feed has been discharged from the hopper. An inclined cam surface 229a is provided on the lower face of latch member 229 to facilitate movement of the bottom plate 227 therepast under the urging of spring 228.

Figure 11:
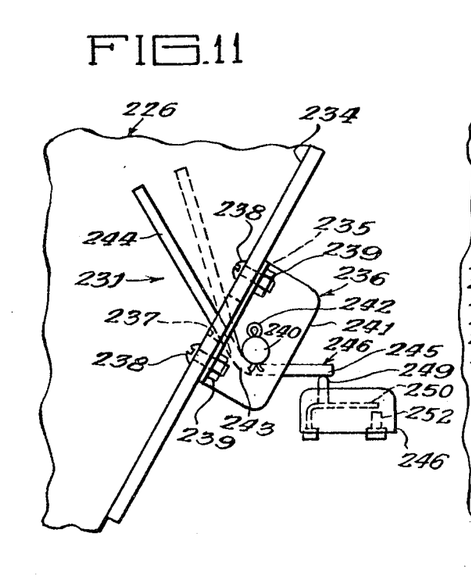
FIG. 11 is an enlarged fragmentary central sectional view through the hopper means at the central supply station of the embodiment of FIG. 9.
Figure 12:
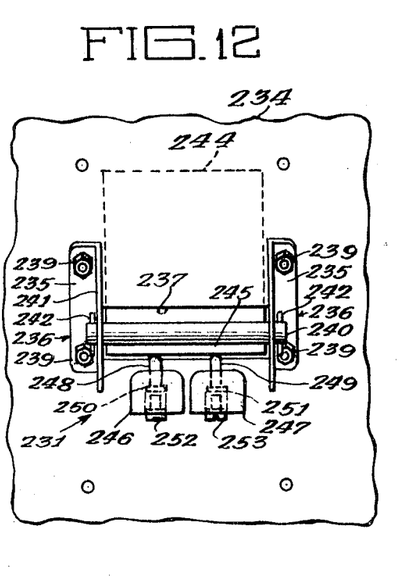
FIG. 12 is a side elevational view of the hopper portion illustrated in FIG. 11.

A plurality of vane switch means 231, 232 and 233, each responsive to a different amount of feed within hopper 226, are mounted on a side wall 234 of the hopper, and each of switch means 231–233 is substantially identical in structure, so that only switch means 231 is described in detail. Referring to FIGS. 11 and 12, transversely extending portions 235 of L-shaped brackets 236 are secured at opposite sides of an elongated opening 237 in wall 234 by screws 238 and nuts 239. A plurality of sets of clearance openings for screws 238 may be provided in wall 234, so that the position of the switch actuators may be adjusted as desired. A transversely extending pin 240 is pivotally received in aligned openings in the perpendicular portions 241 of brackets 236, and cotter pins 242 are received in suitable openings in the pin 240 outwardly of bracket portions 241 to prevent axial movement of the pin 240. The knee 243 of a generally L-shaped switch actuator is fixed to the under surface of pin 240, as by welding, and the actuator includes an enlarged portion 244 that extends inwardly of hopper wall 234 through opening 237. Actuator portion 244 has substantial lateral extent, as is evident from FIG. 12, and the actuator is movable from the full to the broken line position of FIG. 11 by the accumulation of a predetermined amount of material within the hopper 226.

The feed responsive actuator further includes a portion 245 extending outwardly from knee 243, and bearing upon the respective plungers 248 and 249 of a pair of laterally spaced single-pole, single-throw switches 246 and 247. Plungers 248 and 249 are in operative engagement with respective spring-like switch arms 250 and 251, and movement of the L-shaped actuator from the full to the broken line position causes the actuator portion 245 to effect movement of the switch arms 250 and 251 into engagement with contacts 252 and 253 respectively. As will be evident from the description of FIG. 9 hereafter, contact 252 is connected in circuit with solenoid 230, while contact 253 is connected in circuit with the trough motor M2.

Figure 10:
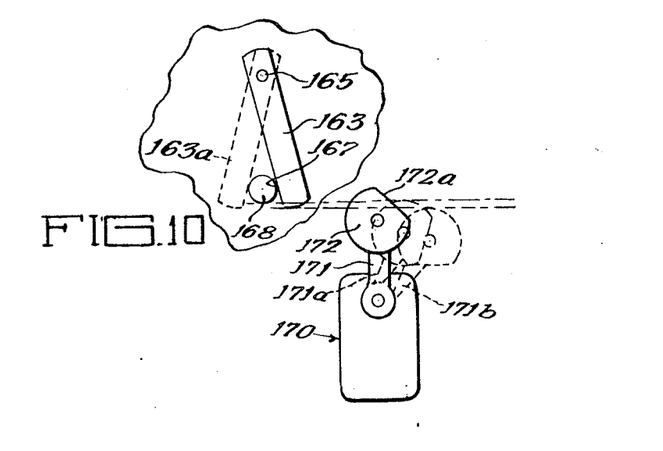
FIG. 10 is a fragmentary side elevational view of one of the triggers of the programmable information storing means and the associated read-out means utilized in connection with the control means of FIG. 9.

Each material carrying area of the reciprocable trough includes twelve vertically arranged, selectively programmable triggers 163, and the triggers 163 may be programmed into a switch actuating or non-actuating position by selective placement of a pin 168 in an opening 167 disposed vertically below the trigger pivot 165. Read-out means, in the form of twelve vertically arranged limit switches 170, mounted at a fixed location relative to the trough, is provided for reading the information selectively programmed into triggers 163. When a pin 168 is positioned as shown in FIG. 10 and the trough is moving from left to right, the lower end of the trigger 163 will engage the curved portion of a pivoted one-way roller 172 carried at the upper end of switch actuator 171, and the switch actuator will be moved to the broken line position 171b to connect the respective limit switch in a circuit with a vane switch of the hopper 226. If the trigger 163 is programmed so as to be in the broken line position illustrated at 163a, the pin 168 will engage the curved portion of roller 172 as the trough moves from left to right and pivot the actuator 171 to the intermediate or neutral broken line position 171a. When the trigger 163 or pin 168 moves out of engagement with the roller 172, internal spring means of the switch 170 returns the actuator to the full line position illustrated in FIG. 10.

The twelve limit switches are divided into four banks I, II, III, IV (FIG. 9) with the individual limit switches of each bank including respective subscripts, a, b, c and d. Limit switch banks I and II control the amount of feed that is to be dispensed into one row of animal feeding stations, while limit switch banks III and IV control the amount of feed that is to be dispensed into the other row of animal feeding stations; with the feed quantity for the animal feeding stations to one side of the central supply source being operatively responsive to switch banks I and III, and the feed quantity for the animal feeding stations on the other side of the central supply source being operatively responsive to switch banks II and IV.

The limit switches 170a and 170c of banks I and III, respectively, are constructed to be actuated by their associated triggers when the trough is moving from left to right, and to remain unactuated when the trough is moving from right to left. In a like manner, the limit switches 170b and 170d of banks II and IV, respectively, are constructed to be actuated when the trough moves from right to left, and are constructed to remain unactuated when the trough moves from left to right. The pivotally mounted, one-way rollers 172 on switch actuating arms 171 are provided for this purpose, and as is clear from FIG. 10, the engagement of the lower end of trigger 163 with roller 172 will pivot the roller 172 relative to the switch actuating arm 171, as well as to pivot the switch actuating arm 171 relative to the switch contacts. When the trough is moving from right to left as viewed in FIG. 10, the lower end of trigger 163 will engage the inclined surface 172a on the roller 172, and move over the roller without actuating the switch. If the trigger 163 is in the broken line position shown in FIG. 10 and the trough is moving from right to left, trigger 163 will engage the inclined surface 172a on roller 172, and the roller 172 will be pivoted about its axis relative to its actuating arm 171, and without pivoting the actuating arm itself, with torsion spring means (not shown) being provided to return the roller 172 to the full line position. It will be understood that the switches in banks II and IV will be reversed with respect to that illustrated in FIG. 10, so that the triggers associated therewith will actuate the switches as the trough moves from right to left but not as the trough moves from left to right.

Turning now to FIG. 9, it will be noted that when the limit switches are between the rows of triggers on the trough, and when the switch arm 75 is in the full line position, a circuit is complete to the motor M2 through lines 84, 260, 261, the contacts 170a–1 of the limit switches 170a in bank I, and lines 262, 274 and 259. The trigger 163 associated with the lowermost limit switch 170a in bank I may be selectively programmed by placement of a pin 168 to move the switch actuator 171 to contact 170a–2 to interrupt the circuit to the motor M2 and thus stop movement of the trough. In order to prevent coasting of the trough past the limit switches, motor M2 is preferably a dynamically braked motor, which will minimize trough coasting and serve to immediately stop the trough and retain each set of triggers in operative engagement with the limit switches.

Assuming that the vane switch means 231 has been set to close when ten pounds of feed has accumulated in hopper 226, the trigger 163 associated with the uppermost limit switch in bank I will be selectively programmed by placement of a pin 168 so as to position the trigger in the full line position of FIG. 10, whereupon the switch actuator 171 of the associated limit switch will be moved into engagement with contact 170a–3 when the set of triggers moves into operative association with the limit switches and the motor is stopped. When the level of feed accumulates in hopper 226 to a sufficient height to move the portion 245 of the vane switch actuator to a switch closing position, a circuit will be complete to the solenoid 230 through contact 252, and lines 270 and 271. The energization of solenoid 230 will cause the latch 229 to be withdrawn, allowing the weight of accumulated feed within the hopper 226 to pivot the bottom plate 227 downwardly, and dispense the quantity of accumulated material onto the trough area. When the vane actuator of switch means 231 is closed, a circuit is also completed to motor M2 through contact 253 and lines 272, 273, 274 and 259, so that the trough begins to move the first set of triggers away from the limit switches. As the triggers move away from the limit switches, the actuator 171 of the uppermost limit switch 170a will return into engagement with contact 170a–1 while the actuator 171 of the lowermost limit switch 170a will move into engagement with contact 170a–1 to retain the motor M2 energized. It will be understood that the trigger associated with the intermediate limit switch in bank I and the triggers associated with the limit switches in bank III are programmed to move the switch actuators 171 thereof to the neutral contacts 170a–2 and 170c–2, respectively, while the triggers 163 associated with the limit switches in banks II and IV will engage the inclined surfaces 172a on rollers 172 so as not to move the switch actuators 171.

Assuming that the vane switches of switch means 232 and 233 are set to be actuated by an accumulation within hopper 226 of 20 and 30 pounds, respectively, twenty pounds of feed will be distributed at a particular material carrying area of the trough by programming the trough trigger associated with the intermediate limit switch of bank I to move its associated switch actuator 171 into engagement with contact 170a–3, while the other triggers are programmed to move their respective switch actuators to the neutral position whereupon a circuit is completed to the solenoid 230 and to the motor M2 through lines 266 and 267, switch 232 and lines 273 and 274; and if it is desired to deposit 30 pounds of feed at a particular trough area, the trigger associated with the lowermost trigger switch in bank I is programmed to move its associated actuator 171 into engagement with contact 170a–3, while the triggers associated with the other limit switches are programmed to move their respective switch actuators to the neutral position, whereupon a circuit is completed to the solenoid 230 and to the motor M2 through lines 268, 269, switch 233, and lines 273 and 274.

When the trough is moving from right to left, the limit switches in bank I will be inactive while the limit switches in bank II will control the amount of feed that is distributed on an opposite side of the central supply source. The triggers on the trough corresponding to the limit switches in bank II may be selectively programmed in a manner similar to that described above in connection with the triggers associated with the limit switches in bank I, so that ten, twenty or thirty pounds of feed may be distributed into each of the material carrying areas.

When the desired amount of feed has been distributed into each of the animal feeding stations controlled by banks I and II, reversing means 74 is actuated to reverse the trough diverters, and condition the control circuit for actuation by the limit switches in banks III and IV. It will be understood, of course, that the limit switches in bank III will function in a manner similar to the limit switches in bank I to control the amount of feed that is distributed into a first set of animal feeding stations on one side of the central supply source, while the limit switches in bank IV will function in a manner similar to the limit switches in bank II to control the amount of feed that is distributed into the animal feeding stations on an opposite side of the material supply source.

We claim:
1. In conveying and feeding apparatus wherein material is deposited at a plurality of material carrying areas on a conveyor from material supply means and the conveyor is movable into dispensing relationship with a plurality of sets of animal feeding stations to dispense material from the conveyor into the animal feeding stations, each set of animal feeding stations having at least as many individual stations as the number of material carrying areas on said vonveyor with each conveyor material carrying area servicing a plurality of individual animal feeding stations, means for regulating and controlling the amount of material that is dispensed at each animal feeding station comprising: a plurality of information storing means, one such means being provided for each conveyor material carrying area and each such means selectively receiving programmable information regarding the amount of material to be dispensed to the plural animal feeding stations serviced by the respective material carrying area; read out means for receiving information from said information storing means; and means responsive to the reading of information by said read out means for regulating the amount of material that is to be deposited at each material carrying area on said conveyor for each animal feeding station serviced by the area to control the amount of material that is dispensed at each animal feeding station.

2. Conveying and feeding apparatus as set forth in claim 1 in which said supply means is disposed centrally of said sets of animal feeding stations, with said conveyor being reciprocable back and forth between at least two sets of animal feeding stations.

3. Conveying and feeding apparatus as set forth in claim 2 in which each information storing means includes at least one device that is selectively programmable with information regarding the material to be dispensed in one animal feeding station in each set of stations.

4. Conveying and feeding apparatus as set forth in claim 3 in which said read out means includes means for reading information from each device regarding plural stations.

5. Conveying and feeding apparatus as set forth in claim 4 in which said devices are pivotally mounted triggers, each said trigger being programmable for one animal feeding station in one set of stations by a first blocking member for preventing pivotal movement of said trigger in one direction and programmable for one animal feeding station in the other set of stations by a second blocking member for preventing pivotal movement of said trigger in an opposite direction, and wherein said read out means includes switches having an actuator movable in a first direction by a trigger when said conveyor is reciprocated in one direction and movable in a second direction by the trigger when said conveyor is reciprocated in an opposite direction.

6. Conveying and feeding apparatus as set forth in claim 5 in which each information storing means includes a plurality of pivotally mounted triggers, and wherein said read out means includes a single set of plural switches, each switch in the set being positioned to be actuated by one trigger in each information storing means.

7. Conveying and feeding apparatus as set forth in claim 6 in which said amount determining means includes motor means for moving said conveyor, and wherein said switches are connected in circuit with said motor for controlling energization thereof.

8. Conveying and feeding apparatus as set forth in claim 7 wherein said triggers are carried by said conveyor, and said switches are mounted on a support fixed relative to said conveyor.

9. Conveying and feeding apparatus as set forth in claim 8 wherein the triggers of each information storing means are horizontally offset with respect to one another, and the switches of said set are vertically arranged.

10. Conveying and feeding apparatus as set forth in claim 9 wherein said amount determining means further includes motor controlling means responsive to actuation of a switch for interrupting the circuit to said motor.

11. Conveying and feeding apparatus as set forth in claim 10 in which said motor controlling means includes a plurality of adjustable amount controlling means, each amount controlling means being operatively responsive to one of said switches.

12. Conveying and feeding apparatus as set forth in claim 7 in which said motor means has a plurality of speeds, and wherein said amount determining means further includes means responsive to actuation of a switch for changing the speed of said motor means.

13. Conveying and feeding apparatus as set forth in claim 2 in which a material accumulating hopper is provided at said supply source, said amount determining means including means responsive to the accumulation of preselected quantities of material within said hopper for dispensing material from said hopper onto a material carrying area of the conveyor.

14. Conveying and feeding apparatus as set forth in claim 13 wherein said read out means includes means for stopping said conveyor to position each of said conveyor material carrying areas in material receiving relationship with said hopper.

15. Conveying and feeding apparatus as set forth in claim 2 in which two additional sets of animal feeding stations are positioned opposite from said first mentioned sets, with said conveyor being reciprocable along the longitudinal median plane between the first mentioned and last mentioned sets of stations, so that each conveyor feed carrying area services four stations, and wherein said conveyor includes means for alternatively directing feed into said first mentioned set of stations of said last mentioned set of stations.

16. In conveying and feeding apparatus wherein material is deposited on a movable conveyor from a supply source and motor means drives the conveyor into dispensing relationship with a plurality of animal feeding stations to dispense material from the conveyor into the animal feeding stations, means for regulating and controlling the amount of material that is dispensed at each animal feeding station comprising: a plurality of selectively programmable information storing means, one such means being provided for each animal feeding station and each such means containing selected information regarding the amount of material to be dispensed in its respective animal feeding station; read out means for receiving information from said information storing means; and means responsive to the reading of information by said read out means for regulating the amount of material that is deposited on said conveyor to control the amount of material that is dispensed at each animal feeding station, said responsive means including means for varying the speed at which said motor means drives said conveyor past said supply source.

17. Conveying and feeding apparatus as set forth in claim 16 in which said conveyor contains a plurality of material carrying areas, each area corresponding to at least one animal feeding station, and wherein said amount determining means includes means for stopping said conveyor to position each material carrying area at said supply source, said amount determining means also including means for varying the length of time said stopping means retains each material carrying area at said supply source.

18. Conveying and feeding apparatus as set forth in claim 17 in which the motor means reciprocates said conveyor and wherein said stopping means includes switch means connected in circuit with said motor means.

19. Conveying and feeding apparatus as set forth in claim 18 wherein said time varying means includes adjustable means for controlling the length of time said switch means interrupts the circuit to said motor.

20. Conveying and feeding apparatus as set forth in claim 19 wherein said read out means is connected in circuit with said stopping means and is adapted to actuate the switch means thereof to stop said conveyor upon the receipt of appropriate information from one of said information storing means.

21. Conveying and feeding apparatus as set forth in claim 16 in which said conveyor contains a plurality of material carrying areas, each area corresponding to at least one animal feeding station, and wherein said information storing means includes selectively programmable means for changing the speed varying means.

22. Conveying and feeding apparatus as set forth in claim 21 in which the motor means is a multi-speed motor which reciprocates said conveyor, and in which said speed varying means includes switch means connected in circuit with said motor for varying the speed thereof.

23. In conveying and feeding apparatus wherein a conveyor is provided with a plurality of material carrying areas to receive material from a supply source and the conveyor is movable into dispensing relationship with a plurality of animal feeding stations to dispense material from one such area into each animal feeding station, means for regulating and controlling the amount of material that is dispensed at each animal feeding station comprising: a plurality of selectively programmable information storing means, one such means being provided for each animal feeding station and each such means contaning selected information regarding the amount of material to be dispensed in its respective animal feeding station; read out means for receiving information from said information storing means; means responsive to the reading of information by said read out means for regulating the amount of material that is to be deposited in each area of said conveyor to control the amount of material that is dispensed at each animal feeding station, said amount regulating means including means for controlling the discharge from said supply source, and said information storing means including means for actuating the discharge controlling means.

24. Conveying and feeding apparatus as set forth in claim 23 in which a normally closed material accumulating hopper is provided at said supply source, and wherein said discharge controlling means includes a plurality of switches, each switch being operatively responsive to the accumulation of a different quantity of material within the hopper for controlling a circuit to open said hopper upon actuation of a switch.

25. Conveying and feeding apparatus as set forth in claim 24 in which means, including a motor, is operatively connected with said conveyor for reciprocation thereof, and wherein said motor is connected in circuit with said switches so that said motor is energized whenever one of said switches is actuated.

26. Conveying and feeding apparatus as set forth in claim 25 wherein said circuit includes further means to retain said motor energized after an accumulated quantity of material has been dispensed from said supply source and until a succeeding material carrying area of the trough moves into dispensing relationship with said hopper.

27. In a conveying and feeding apparatus wherein a conveyor is reciprocated back and forth above first and second spaced longitudinally extending rows of animal feeding stations, and the conveyor is adapted to dispense material from opposite ends thereof into the animal feeding stations, means for alternatively dispensing material into each of the rows comprising: a material diverter at each end of said conveyor, each diverter being positioned to receive material from one end of said conveyor and each diverter being movable from a first position to direct material into the first row of animal feeding stations to a second position to direct material into the second row of animal feeding stations; means for releasably retaining said diverters in their first or second positions; first and second abutments on each of said diverters; first and second cams at each end of said rows of animal feeding stations, the first cam at one end of said rows of animal feeding stations being positioned to engage the first abutment on the diverter at one end of said conveyor to pivot the diverter from first to second position, the second cam at one end of said rows of animal feeding stations being positioned to engage the second abutment on the diverter at said one end of the conveyor to pivot the diverter from second to first position, the first cam at an opposite end of said rows of animal feeding stations being positioned to engage the first abutment on the diverter at an opposite end of said conveyor to pivot the diverter from first to second position, the second cam at said opposite end of said rows of animal feeding stations being positioned to engage the second abutment on the diverter at the opposite end of said conveyor to pivot the diverter from second to first position, and means for rendering said cams ineffective to pivot said diverters.

28. Conveying and feeding apparatus as set forth in claim 27 including means pivotally mounting said diverters on said conveyor, and means engageable with said diverters for retaining the diverters in an inclined relationship with respect to the path of travel of the conveyor when the diverters are in first and second position.

29. Conveying and feeding apparatus as set forth in claim 28 including over-center spring means for releasably retaining the diverters in first and second position.

30. Conveying and feeding apparatus as set forth in claim 29 including support means mounting said cams for vertical movement relative to said diverters.

31. Conveying and feeding apparatus as set forth in claim 30 wherein releasable retention means is selectively operable to retain the cams in an upward position, so that engagement of the cams by the abutments will overcome the over-center spring means and reverse the diverters.

32. Conveying and feeding apparatus as set forth in claim 31 wherein solenoid means is provided for operating said retention means, so that said abutments will depress said cams upon engagement therewith whereupon said diverters will be retained in the same position.

33. Conveying and feeding apparatus as set forth in claim 32 wherein said cams have arcuate abutment engaging surfaces and said abutments are L-shaped members carried on the lower surface of said diverters.

References Cited
UNITED STATES PATENTS

| | | | |
|---|---|---|---|
| 3,200,933 | 8/1965 | Schenk et al. | 198—38 |
| 3,214,003 | 10/1965 | Wilson | 198—38 |
| 3,217,693 | 11/1965 | Loesch et al. | 119—56 |
| 3,233,720 | 2/1966 | Anaasoff et al. | 198—38 |
| 3,237,807 | 3/1966 | Garvey | 119—56 X |
| 3,252,444 | 5/1966 | Haen | 119—52 |
| 3,327,836 | 6/1967 | Burt | 214—11 |
| 3,351,176 | 11/1967 | Boissevain | 198—38 |
| 3,361,247 | 1/1968 | Lauzon et al. | 198—38 |
| 3,376,982 | 4/1968 | Hutchinson | 198—38 |
| 3,383,011 | 5/1968 | Reed et al. | 214—11 |

ALDRICH F. MEDBERY, Primary Examiner

U.S. Cl. X.R.

198—38; 214—11; 221—2; 222—23